No. 701,458. Patented June 3, 1902.
J. ARMSTRONG.
PROCESS OF OBTAINING ZINC OR OTHER VOLATILE METALS FROM ORES OR MATTES.
(Application filed Aug. 30, 1900.)
(No Model.)
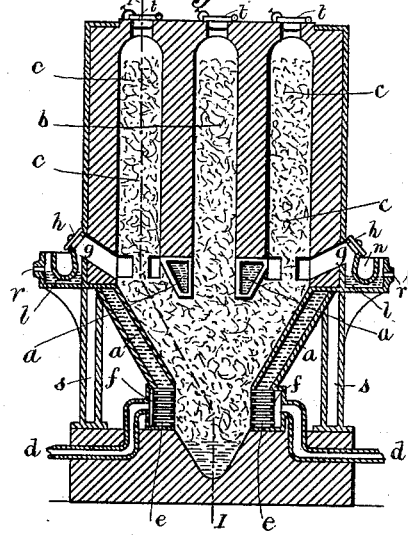
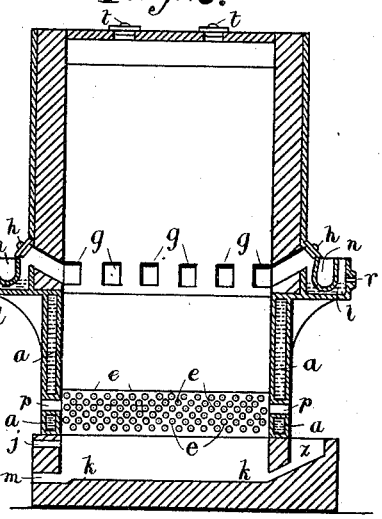
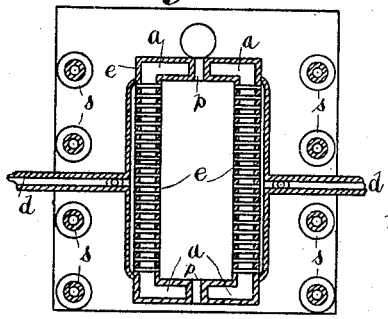
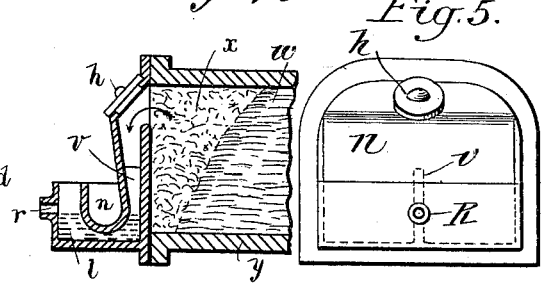
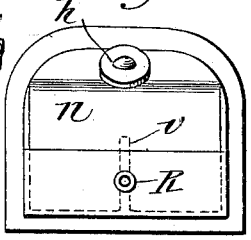
Witnesses
Hubert A. Gill.
Hubert Pumphrey
Inventor
John Armstrong
by his Att'y

UNITED STATES PATENT OFFICE.

JOHN ARMSTRONG, OF LONDON, ENGLAND.

PROCESS OF OBTAINING ZINC OR OTHER VOLATILE METALS FROM ORES OR MATTES.

SPECIFICATION forming part of Letters Patent No. 701,458, dated June 3, 1902.

Application filed August 30, 1900. Serial No. 28,570. (No specimens.)

*To all whom it may concern:*

Be it known that I, JOHN ARMSTRONG, a subject of the Queen of Great Britain, residing at 46 Lombard street, in the city and county of London, England, have invented a new and useful Improved Process of Obtaining Zinc or other Volatile Metals from Ores or Mattes, of which the following is a specification.

This invention relates to zinc and other volatile metals, and has for its object the provision of a process whereby metal may be obtained from ores or mattes or oxids or mixtures with other ores or materials and with more expedition and with less loss and labor and greater economy than by the ordinary processes.

I will first describe the process in its application to zinc.

Hitherto zinc ore or residues from other processes containing zinc, if in the form of calamin or carbonate or of blend or sulfid, have first to be roasted to get rid of the carbonic acid or sulfur they may contain with the object of reducing the zinc to a state of oxid. When this is accomplished, the roast is mixed with about fifty per cent. of carbon and placed in a retort and distilled, the gaseous metallic zinc being condensed in condensers attached to the retorts; but this method of reducing zinc to the metallic state is unavoidably accompanied by serious loss in metal, mainly due to the difficulty of condensing the vapors and the oxidation of the vapors in the condensers or attachments and the wear and tear and breakage of retorts. My present invention is designed to obviate these losses and at the same time to distil the zinc and condense the vapors more rapidly and economically than hitherto. I accomplish this mainly by using carbon-monoxid gas and condensing under pressure.

My invention can be carried on either in retorts, muffles, reverberatory or blast or other furnaces, and by means of exhaust (partial vacuum) or pressure. If retorts or muffles are used, they may be of any convenient form, preferably with an aperture at each end, but capable of being entirely sealed to exclude atmospheric air. The retorts or muffles are charged with the ordinary mixture and fired up in the ordinary way and at about the ordinary heat. I then send a current of hot carbon-monoxid gas under a very slight pressure through the retort, which rapidly reduces the zinc and acts as a forward carrier for the metallic vapors, any carbonic acid formed being taken up immediately by the carbon in the charge. These vapors are now driven out of the retort into a condenser, which condenses rapidly all the metallic vapors and filters the vapors by passing through the liquid bath of zinc, (or other equivalent.) Where the bath is exposed, I cover the surface of the metal with some non-oxidizing or neutral substance with a melting-point below that of zinc. Such a substance as zinc chlorid alone or mixed with caustic alkali and tartrate of potash I have found to answer very well. Any suitable means may be employed for passing the vapors through the bath, such as sucking them up by means of a pump or exhaust and then pressing them through the bath or by using the pressure of the expansive power of the vapors themselves in forcing their way through the bath without any carbon-monoxid gas being passed in from the opposite end of the retort, or the vapors may be made to be squirted by means of a series of tubes inserted into and under the metal in the bath, so that the vapors are broken up into various channels.

A furnace suitable for carrying my invention into effect comprises a retort or muffle containing a charge of ore, carbon, or coke, through which the gases pass and flow through vertical tubes and through the metallic bath. The tap-hole is plugged up until the zinc rises in the bath to the requisite height. It is then tapped off by withdrawing the plug, when the bath will resume its normal level, which keeps a seal on the siphon-trap. In order to regulate the temperature of the trap, the space above the trap is filled either with a heating or with a cooling medium. When this condensing apparatus is applied to retorts or muffles, it is hung with close-fitting joints, so that it can be lifted away to charge or empty the retorts, or they may be charged or emptied from the opposite end, as may be found most convenient. The zinc-bath is used expressly for the purpose of condensing the metallic vapors to the liquid metallic state, and the object of the various channels, as already described, leading down into the bath is for the purpose of bringing the metallic vapors mixed with other gases into intimate contact with molten metallic zinc, which rapidly condenses the zinc-vapor in the same manner in which water condenses steam when that is introduced into it by similar means. Means have been devised whereby the non-condensable gases either escape from the open orifice of the bath or are collected for further use. The coke or carbon filled into the mouth of the retort or muffle is for the purpose of consuming any carbonic acid that may be mingled with the gases before they pass down through the metallic bath. In conducting these operations in a blast-furnace or reverberatory or other furnace I proceed as follows: Any blast or other furnace may be employed with the necessary modifications to meet the circumstances to be described; but I prefer to carry out my operations in a furnace similar to the one described and shown. The upper part of the furnace is divided into three compartments ordinarily closed at the top with feeding devices or caps. The central compartment is filled with the charge, consisting of one hundred parts of calcined ore and about fifty parts of carbon (if the ordinary charge of a zinc-retort is being used) and mixed in the usual manner. The compartments on either side are filled with fuel, preferably with coke or anthracite. The blast is supplied by means of pipes to numerous twyers which pass through the water-jacket, and by doing so supply a gentle pressure of blast over a very large surface and through a large quantity of twyers or tubes. By the fuel occupying the two outside compartments and by its weight as it is burned away it sinks and is thereby always coming in a fresh volume before the mouth of the openings and also in front of the twyers, where the blast meets it in small streams, converting it into carbonic dioxid immediately. This is driven through a further quantity of fuel and converted into carbon monoxid. It then comes toward the center of the furnace and into intimate contact with the descending column of the charge, exercising upon it a reducing action and converting it into metallic vapor, which passes upward and onward and through the descending columns of fuel in the outer compartments, which are in a state of incandescence, whereby any carbonic acid or oxid is immediately taken up, while the vapors pass into the condenser and through the metallic (liquid) bath, as has just been described with regard to retorts.

In order that my invention may be better understood, I append the following drawings of apparatus applicable for this invention.

In the drawings, Figure 1 shows a sectional elevation of a furnace used for smelting zinc in accordance with my invention. Fig. 2 shows a longitudinal section of same on line II of Fig. 1. Fig. 3 shows a sectional plan, and Fig. 4 shows a sectional elevation, of a metal bath and an ordinary retort-outlet on an enlarged scale. Fig. 5 shows an end view of the same.

Referring first more particularly to Fig. 4 of the accompanying drawings, $y$ is a retort or muffle, such as has hitherto been used for distilling zinc.

$w$ indicates the charge of ore and carbon; $x$, the carbon or coke, through which the gases pass and flow in the direction of the arrow through the vertical tubes $v$ through the metal bath $l$. An inspection-cover $h$ fits tight to its place and is hermetically sealed.

$r$ is a tap-hole, which is plugged up until the zinc rises in the bath to the requisite height. It is then tapped off by withdrawing the plug, when the bath will resume its normal level, which keeps a seal on the syphon-trap $n$. In order to regulate the temperature of the trap, the space above the trap $n$ is filled either with a heating or with a cooling medium. When the furnace is first blown in, a heating medium is required, at other times usually a cooling medium, such as water. When this condensing apparatus is applied, as shown, to retorts or muffles, it is hung with close-fitting joints, so that it can be lifted away to charge or empty the retorts, or they may be charged or emptied from the opposite end, as may be found most convenient. The zinc-bath is used expressly for the purpose of condensing the metallic vapors to the liquid metallic state, and the object of the various channels, as already described, leading down into the bath is for the purpose of bringing the metallic vapors mixed with other gases into intimate contact with the molten metallic zinc, which rapidly condenses the zinc-vapor in the same manner in which water condenses steam when that is introduced into it by similar means. Means are devised whereby non-condensable gases either escape from the open orifice of the bath or are collected for further use. The coke or carbon filled into the mouth of the retort or muffle is for the purpose of consuming any carbonic acid that may be mingled with the gases before they pass down into the bath.

The furnace is of the water-jacket type of blast-furnace, the water-jacket being shown at $a\ a\ a$. The upper part of the furnace is divided into three compartments, ordinarily closed at the top with feeding devices or caps $t\ t\ t$. The central compartment $b\ b$ is filled with the charge, consisting of one hundred parts of calcined ore and about fifty parts of carbon (if the ordinary charge of a zinc-retort is being used) and mixed in the usual manner. The compartments $c\ c$ on either side are filled with fuel, preferably with coke or anthracite. This furnace is square or oblong in plan; but it could be round or other shape and a series of chambers $c$ made to surround chambers $b$. The blast is supplied by means of the pipes $d\ d$ to numerous twyers $e\ e\ e$, which pass through the water-jacket at $f\ f$ and by doing so supply a gentle pressure of blast over a very large surface and through a large quantity of twyers or tubes. By the fuel occupying the two outside compartments and by its weight as it is burned away it sinks and is thereby always coming in a fresh volume before the mouth of the opening $g\ g$ and also in front of the twyers, where the blast meets it in small streams, converting it into carbonic dioxid immediately. This is driven through a further quantity of fuel and converted into carbon monoxid. It then comes toward the center of the furnace and into intimate contact with the descending column $b\ b$ of the charge, exercising upon it a reducing action and converting it into metallic vapor, which passes upward and onward and through the descending columns of fuel in the compartments $c\ c$, which are in a state of incandescence, whereby any carbonic acid or oxid is immediately taken up while the vapors pass through the orifice $g\ g$ into the condenser and through the matallic (liquid) bath, as has just been described with regard to retorts.

A description of the bath, the tap-hole, the exit of the gases or their collection, and other parts of the condensing apparatus need not be repeated, as they are precisely similar to what has already been described.

Other metals or metallic ores or mattes which are invariably present in zinc ores and which are also sometimes mixed with the charge as fluxes or desulfurizing agents—such metals as copper, lead, iron, tin, silver, gold, and the like which are not sensibly volatile in a reducing atmosphere with fluxes—are reduced in the above furnace and collected either in the metallic form or as mattes in the sump at the lower part of the furnace, (marked $k\ k$.) Tapping-holes are provided for metals at $m$, $z$ being a well outside for taking off lead, $j$ being a tap-hole for slag or matte. When it is required not to mix the flux with the charge before it is placed in the furnace, the fluxes may be rammed into the furnace through the orifices $p\ p$ right in front of the twyers.

The upper part of the furnace is supported upon the columns marked $s\ s$.

Although I have described herein the reduction and recovery of zinc from its ores or from mixtures with other ores or mattes, the same process can equally well be applied for the recovery of other metals which are volatile, whether they may be mixed or unmixed with non-volatile metals or not, such volatile metals being antimony, mercury, or cadmium or the like.

What I claim is—

1. The process of smelting compounds of volatile metals such as described, which consists in heating them with carbon out of contact of air, reducing and vaporizing them in a reducing atmosphere, consisting largely of carbon monoxid, and condensing them by passing the metallic vapors and the carbon monoxid into a bath of the same metal that is being condensed, which bath is maintained in a molten state, but not much above melting-point, condensing the metal in said bath and passing the carbonic oxid through the same.

2. The process of smelting compounds of volatile metals such as described, which consists in heating the finely-divided ore with finely-divided carbon out of contact of air or free oxygen, reducing and vaporizing the metal, and passing the vapors through or among carbon at a still higher temperature and from there to a bath of the same metal which is being condensed, but in a molten condition, and condensing the metallic vapors in said bath.

3. The process of smelting compounds of volatile metals such as described, which consists in heating carbon and the ore together out of contact of free oxygen, distilling off the metal and passing the same together with such carbonic oxid and nitrogen as are present with it but without free oxygen or carbonic acid into a bath of the same metal in the molten state, substantially as described, whereby the metal is condensed and the carbon monoxid and nitrogen escape through the bath.

4. The process of smelting compounds of volatile metals such as described, which consists in reducing the ore to a finely-divided state, mixing the same with finely-divided fuel and submitting it to the requisite heat in an atmosphere of carbon monoxide in which no free oxygen or carbonic acid is present, distilling off the volatile metal still surrounded by an atmosphere of carbon monoxid and condensing the metal in a bath of the same metal in a liquid state, and tapping off the less volatile metals.

5. The improvement in the process of smelting compounds of volatile metals, such as described, which consists in bringing them into the vapor state out of presence of oxygen or carbonic oxid and passing the vapors through a bath of the same metal in a liquid state at a little above its fusing-point, whereby the metal is condensed and any neutral gas that may be present passes through the bath and liquid metal, and escapes.

In testimony whereof I have signed my name to this specification in the presence of two subscribing witnesses.

JOHN ARMSTRONG.

Witnesses:
HERBERT SEFTON-JONES,
GEORGE HUGHES.